US010165758B2

(12) United States Patent
Oblack et al.

(10) Patent No.: US 10,165,758 B2
(45) Date of Patent: Jan. 1, 2019

(54) ROLLING PET TOY (71) Applicant: Doskocil Manufacturing Company, Inc., Arlington, TX (US)

(72) Inventors: Mark J. Oblack, Issaquah, WA (US); Kyle D. Burger, Seattle, WA (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 104 days.

(21) Appl. No.: 13/963,159

(22) Filed: Aug. 9, 2013

(65) Prior Publication Data
US 2014/0060451 A1    Mar. 6, 2014

Related U.S. Application Data (60) Provisional application No. 61/681,250, filed on Aug. 9, 2012.

(51) Int. Cl.
*A01K 15/02*     (2006.01)

(52) U.S. Cl.
CPC .......... *A01K 15/026* (2013.01); *A01K 15/025* (2013.01)

(58) Field of Classification Search
CPC ..... A01K 15/025; A01K 15/026; A01K 15/02
USPC ........................................................ 119/707
See application file for complete search history.

(56) References Cited

U.S. PATENT DOCUMENTS

| | | | | |
|---|---|---|---|---|
| 678,265 | A * | 7/1901 | Low | 473/589 |
| 4,560,358 | A * | 12/1985 | Adler | 446/46 |
| 4,820,230 | A * | 4/1989 | Richards | 446/48 |
| 4,906,007 | A * | 3/1990 | Mitchell et al. | 473/589 |
| 4,973,284 | A * | 11/1990 | Sassak | 446/48 |
| 5,020,808 | A * | 6/1991 | Richards | 473/589 |
| 5,026,054 | A * | 6/1991 | Osher et al. | 473/594 |
| 6,247,989 | B1 * | 6/2001 | Neff | 446/46 |
| 6,918,355 | B1 * | 7/2005 | Arvanites | 119/707 |
| 7,007,290 | B2 * | 2/2006 | Wilcoxson et al. | 720/718 |
| 2003/0193107 | A1 * | 10/2003 | Byrne | 264/148 |
| 2004/0089981 | A1 * | 5/2004 | Byrne | 264/326 |
| 2009/0199784 | A1 | 8/2009 | Oblack et al. | |
| 2011/0232581 | A1 * | 9/2011 | Gick | 119/707 |
| 2012/0067294 | A1 * | 3/2012 | Curry | A01K 15/025 119/707 |
| 2012/0073513 | A1 * | 3/2012 | McCann | 119/707 |
| 2013/0247836 | A1 * | 9/2013 | Axelrod et al. | 119/709 |

* cited by examiner

Primary Examiner — Son T Nguyen
(74) Attorney, Agent, or Firm — Global IP Counselors, LLP (57) ABSTRACT An improved pet toy is generally ring-like and is rollable along a surface, such as the ground. The pet toy includes a resilient foam core that is surrounded by an elastomeric outboard portion and a fabric inboard portion that are affixed to one another and to the core. The outboard portion has a roughened surface that provides traction with the ground and enables the pet toy to roll in various fashions. The fabric inboard portion includes a stiffening structure in the form of a rib that resists deformation of the pet toy in a radial direction toward and away from a center of the toy.

17 Claims, 6 Drawing Sheets

ROLLING PET TOY

CROSS-REFERENCE TO RELATED APPLICATION

The instant application claims priority from U.S. Provisional Patent Application Ser. No. 61/681,250 filed Aug. 9, 2012, the disclosures of which are incorporated herein by reference.

BACKGROUND

Field

The disclosed and claimed concept relates generally to pet toys and, more particularly, to a pet toy that is rollable along a surface.

Related Art

Numerous types of pet toys are known. Among such toys are fetch-type toys whereby a human throws a toy and the animal typically catches it, chases it, retrieves it, carries it, etc. While such toys have been generally effective for their intended purposes, they have not been without limitation.

Pet toys desirably provide a diversion for an animal and thus preferably are configured to maintain the animal's interest. Sticks and discs that are thrown through the air can hold an animal's interest for at least a short time, but they have experienced limitations in maintaining an animal's interest long term due to the limited fashions in which the toys can be used during play with the animal. Moreover, and depending upon the particular animal, pet toys are subject to destruction from biting, chewing, and the like that occurs during ordinary play.

It thus would be desirable to provide an improved pet toy that maintains an animal's interest for extended periods and that is resistant to destruction.

SUMMARY

An improved pet toy is generally ring-like and is rollable along a surface, such as the ground. The pet toy includes a resilient foam core that is surrounded by an elastomeric outboard portion and a fabric inboard portion that are affixed to one another and to the core. The outboard portion has a roughened surface that provides traction with the ground and enables the pet toy to roll in various fashions. The fabric inboard portion includes a stiffening structure in the form of a rib that resists deformation of the pet toy in a radial direction toward and away from a center of the toy.

Accordingly, an aspect of the disclosed and claimed concept is to provide an improved pet toy having a generally ring-like configuration, whether circular or non-circular in shape, and that is rollable along a surface.

Another aspect of the disclosed and claimed concept is to provide such a pet toy having a resilient core that can withstand chewing and biting by an animal and which enables the pet toy to float in water.

Another aspect of the disclosed and claimed concept is to provide such a pet toy having an elastomeric outboard portion that can provide friction on a surface to facilitate rolling of the toy along the surface.

Another aspect of the disclosed and claimed concept is to provide a fabric inboard portion that can be gripped during throwing by a user and that is formed to include a protuberant rib which resists deformation of the pet toy in a radial direction toward and away from the center of the toy and which thereby facilitates rolling.

Accordingly, an aspect of the disclosed and claimed concept is to provide an improved pet toy that is structured to be rollable along a surface. The general nature of the pet toy can be stated as including a ring-like body that extends in a circumferential direction about a central opening and that is of a fixed or varying radius from a center of the opening. The body can be generally stated as including an inboard portion situated adjacent the central opening and being formed at least in part of a number of interlaced fibers, the inboard portion being formed to have a protuberant rib that extends in a circumferential direction about the opening and protrudes toward the center of the opening, the rib being structured to resist deformation of the body in a radial direction toward and away from the center, an outboard portion situated at a location opposite the inboard portion, the outboard portion being formed at least in part of an elastomeric material and having a peripheral surface that is at least in part arcuate and that is structured to be rollable along a surface, and a resilient core disposed generally between the outboard portion and the inboard portion.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
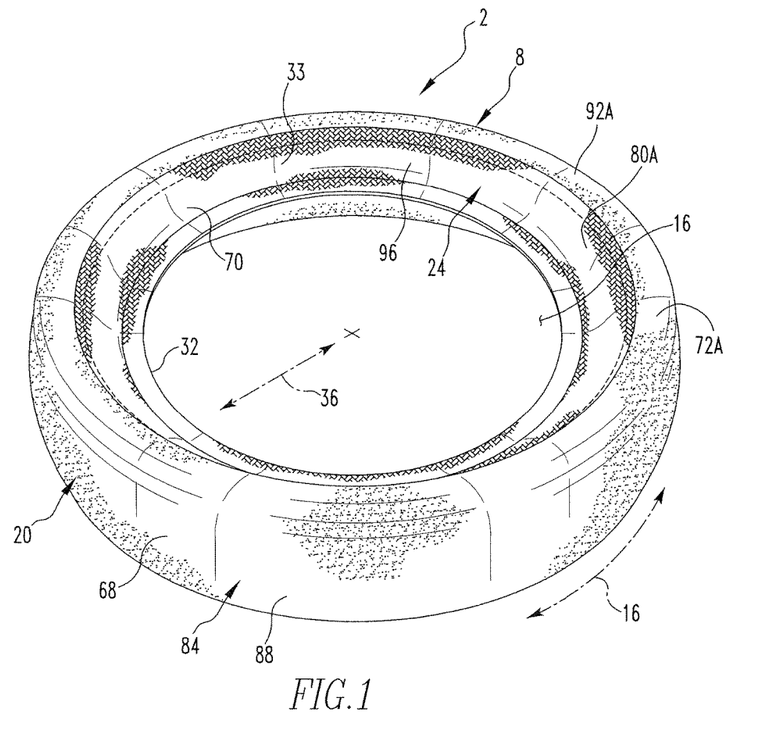
FIG. 1 is a perspective view of an improved pet toy of a ring-like shape in accordance with a first embodiment of the disclosed and claimed concept.
Figure 2:
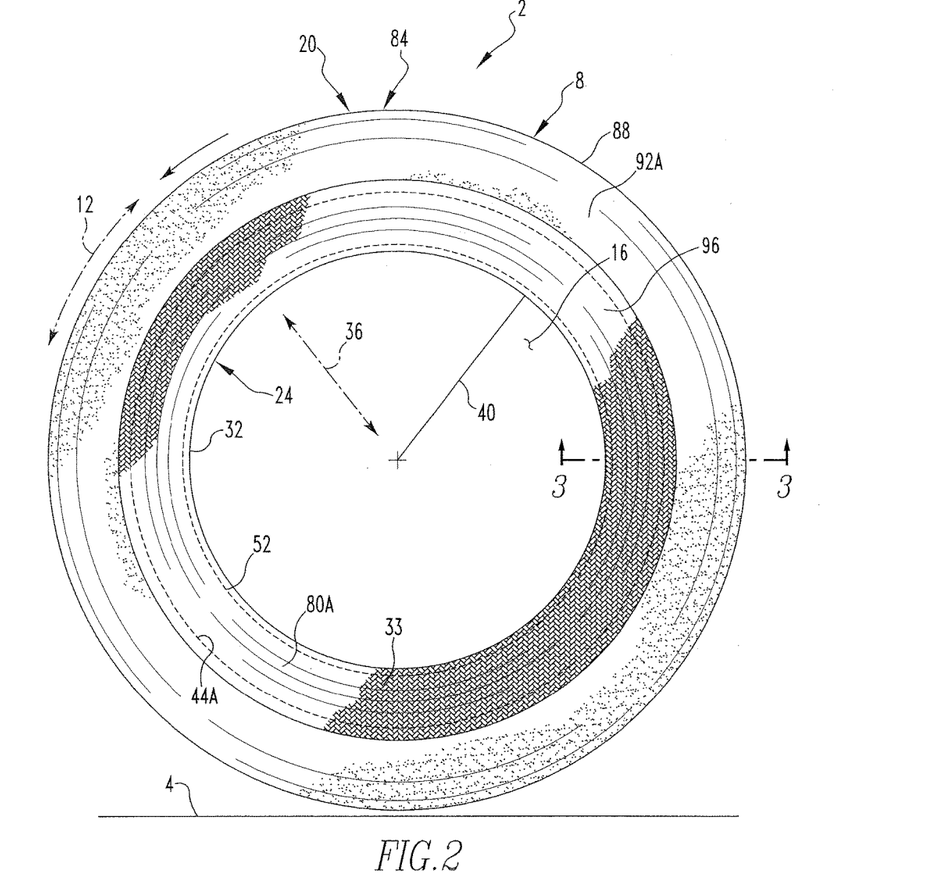
FIG. 2 is a side elevational view of the pet toy of FIG. 1 situated on a surface.
Figure 3:
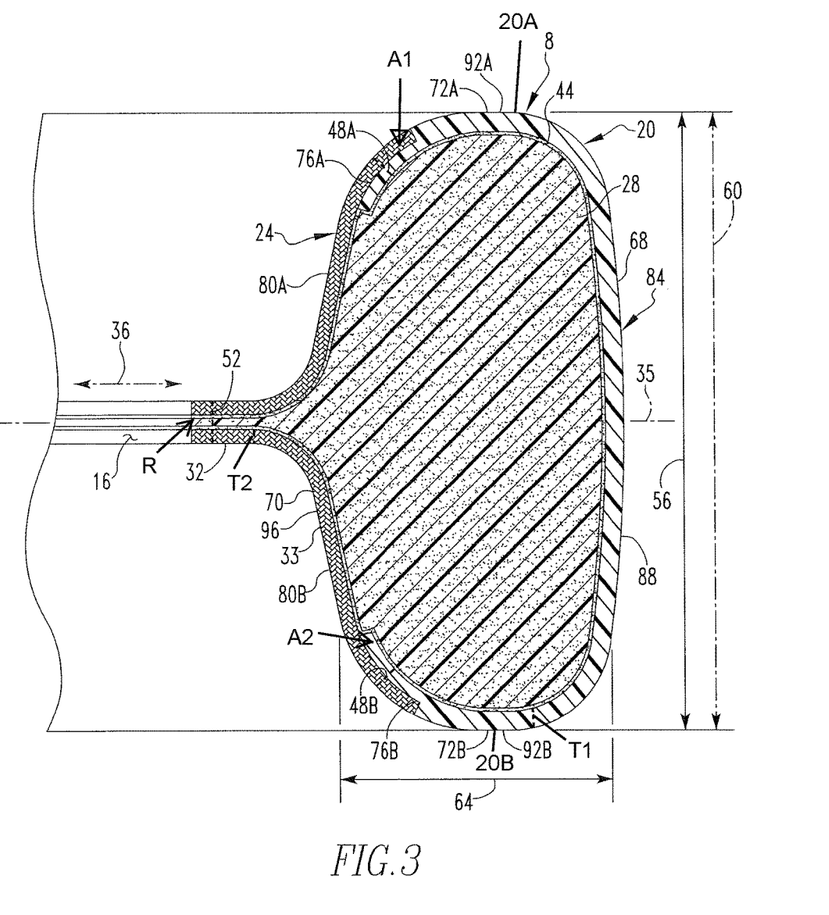
FIG. 3 is a sectional view as taken along line 3-3 of FIG. 2.

An improved pet toy 2 in accordance with a first embodiment of the disclosed and claimed concept is depicted generally in FIGS. 1-3. The pet toy 2 is rollable along a surface 4, as is depicted generally in FIG. 2 and is usable during play with an animal. The pet toy 2 can be said to include a body 8 that is of a generally ring-like shape and that extends in a circumferential direction 12 about a central opening 16. The body 8 can be said to be ring-like or hoop-like since it extends continuously about the opening 16, and it is understood that expressions such as ring-like or hoop-like are thus not intended to be limited to shapes that are strictly circular. That is, while the body 8 can be said to have a generally circular shape, as is depicted generally in FIG. 2, in other embodiments that are described in greater detail below the pet toy described herein can still be ring-like or hoop-like while being of non-circular shapes, without limitation.

The body 8 can be generally described as including an outboard portion 20, an inboard portion 24, and a core 28. The terms "outboard" and "inboard" are used herein generally with respect to a center or a central region of the opening 16, with the outboard portion 20 being generally farther away from the center of the opening 16 than the inboard portion 24. The outboard portion 20 has a maximum thickness T1. The outboard portion 20 also has a pair of oppositely facing axial surfaces 20A and 20B that are separated by a distance that is as width 56 of the body 8. As seen in FIG. 3, the inboard portion 24 has a maximum thickness T2 that is less than the maximum thickness T1. The maximum thicknesses T1 and T2 are depicted by dashed lines in FIG. 3. As will be set forth in greater detail below, the outboard portion 20 and the inboard portion 24 are directly connected together and generally enclose the core 28 between them.

The outboard portion 20 in the depicted exemplary embodiment can be formed from any of a wide variety of elastomeric materials such as rubber-type materials and the like. The inboard portion 24 in the depicted exemplary embodiment is formed of some type of fabric, textile, or other material that is formed of a number of interlaced or interconnected fibers. As employed herein, the expression "a number of" and variations thereof shall refer broadly to any non-zero quantity, including a quantity of one. The core 28 in the depicted exemplary embodiment is formed of a resilient foam material such as a closed cell foam material or other such material that is buoyant and that is generally incapable of being deflated during play with an animal. Alternatively, the core could be made from other materials such as cork, fiber, and the like without limitation. Still alternatively, the core could be in the form of an inflated flexible bladder that would desirably be resistant to puncture damage and other damage.

The body 8 thus can be seen to be formed of generally flexible materials. The inboard portion 24 in the depicted exemplary embodiment is advantageously formed to include a lateral portion 33, at least a portion of which may be of a generally cylindrical or conic configuration, and a protuberant rib 32 that protrudes from the lateral portion 33 in a direction generally toward the center of the opening 16. The rib 32 advantageously resists deformation of the body 8 in a radial direction 36 toward and away from the center of the opening 16, which facilitates rolling of the body 8. The exemplary rib 32 of the body 8 can be said to lie generally in a plane 35 that extends across the opening 16.

It can be understood from FIGS. 1-3 that the body 8 has a substantially fixed cross-sectional shape, such as is depicted generally in FIG. 3, throughout the circumferential extent of the body 8, i.e., throughout its length in the circumferential direction 12. The various parts of the body 8 can also be said to be generally of a fixed radius 40 from the center of the opening 16 throughout the circumferential extent of the body 8.

As can be understood from FIG. 3, the exemplary body 8 is formed by directly affixing the core 28 to both the outboard portion 20 and the inboard portion 24 with a layer of adhesive 44. The adhesive 44 is situated generally between the core 28 and each of the outboard and inboard portions 20 and 24 and can be any of a wide variety of adhesive materials, whether single or multiple component, and the like without limitation. The outboard and inboard portions 20 and 24 can thus be said to be directly affixed to and connected with the core 28.

The outboard portion 20 and the inboard portion 24 are also directly connected together by receiving the inboard portion 24 on a pair of ledges 76A and 76B of the outboard portion 20 and by affixing together the ledges 76A and 76B with the portions of the inboard portion 24 that are overlaid thereon at overlapping areas A1 and A2 of the outboard and inboard portions 20 and 24. In the depicted exemplary embodiment, a first seam 48A and a second seam 48B are formed between the ledges 76A and 76B, respectively, and the portions of the inboard portion 24 overlaid thereon. It is understood, however, that other attachment structures and methodologies can be employed to connect together the outboard and inboard portions 20 and 24, such as through the use of adhesives, melting of the ledges 76A and 76B in contact with the inboard portion 24, and the like without limitation. A third seam 52 is employed on the rib 32 as will be described in greater detail below.

As can further be seen in FIG. 3, the body 8 can be said to have a width 56 as measured in a widthwise direction that is indicated generally at the numeral 60. The body 8 is also of a thickness 64 as measured in the radial direction 36. The overall width 56 and thickness 64 of the depicted exemplary body 8 are substantially unvarying through the circumferential extent of the body 8, although this need not necessarily be the case as will be described in connection with other embodiments that are described in greater detail below.

As can further be seen in FIG. 3, the body 8 can be said to include an outer wall 68, an inner wall 70, a first sidewall 72A, and a second sidewall 72B. The ledges 76A and 76B are situated on the first and second sidewalls 72A and 72B, respectively. The core 28 can be said to be generally enclosed within the outer and inner walls 68 and 70 and the first and second sidewalls 72A and 72B.

The inboard portion 24 is depicted in FIG. 3 as including a first segment 80A and a second segment 80B, both of which are formed of the aforementioned fabric, textile, or other material that is formed with fibers. The first segment 80A extends between the ledge 76A and the rib 32, and the second segment 80B extends between the ledge 76B and the rib 32. The rib 32 in the depicted exemplary embodiment is formed of the ends of the first and second segments 80A and 80B opposite their connections with the ledges 76A and 76B. Such ends are connected together with the third seam 52 to affix such ends together at an overlapping area R of the first and second segments 80A and 80B so that the third seam 52 extends a thickness of the rib 32. While in the depicted exemplary embodiment the core 28 is depicted as including a protuberant portion that extends into the rib 32 and becomes a part thereof, it is understood that in other embodiments the core 28 need not extend between portions of the first and second segments 80A and 80B and into the rib 32.

The protrusion of the rib 32 in the radial direction 36 increases the area moment of inertia of the body 8 in the radial direction 36. The rib 32 thus serves as a stiffening element that resists deformation of the body 8 in the radial direction 36 toward and away from the center of the opening 16. Such deformation resistance by the rib 32 promotes rolling of the toy 2 because it resists the body 8 from partially or fully collapsing in the radial direction 36 when the body 8 lands on the surface 4 during play. Such resistance to collapsing or deforming thus promotes rolling because the body is caused to stay in substantially its original free state shape, and because the energy that would have otherwise been dissipated by the body 8 in deforming is instead retained in the body 8 as kinetic energy that enables the body 8 to roll farther.

The body 8 can be said to generally include an exterior surface 84 that includes a peripheral surface 88 at the exterior of the outer wall 68, a pair of lateral surfaces 92A and 92B situated at the exterior of the first and second sidewalls 72A and 72B, and an inboard surface 96 at the exterior of the inner wall 70. At least a portion of the peripheral surface 88 can be said to be of a generally cylindrical shape. Likewise, portions of the inboard surface 96 that extend along the lateral portions 33 can be said to be generally of a cylindrical or approximately conic shape. The peripheral surface 88 in the depicted exemplary embodiment has a generally rubbery texture, it being reiterated that the outboard portion 20 is formed of an elastomeric material of any of a variety of well understood formulations. The lateral surfaces 92A and 92B are in large part likewise of the same rubbery texture. Such rubbery texture provides friction between the body 8 and a surface 4 whereby the body 8 will tend to roll along the surface 4 when thrown onto the surface 4 during play rather than, for instance, sliding along such surface 4.

It is understood that the material from which the outboard portion 20 is formed is generally of a significantly higher density than the material from which the core 28 is formed. This, plus the overall ring-like shape of the body 8, have the effect of somewhat concentrating the mass of the body 8 at its peripheral regions, which increases the polar moment of inertia of the body 8 about the center of the opening 16 compared with a similar structure of the same weight but being formed without the opening 16 or being homogenous in cross section. Such enhanced polar moment of inertia increases the likelihood that the pet toy 2 will roll along the surface 4 and will continue rolling until its energy has been dissipated. Moreover, and as mentioned above, the rib 32 resists deformation of the body 8 in the radial direction 36 toward and away from the center of the opening 16. This has the effect of resisting the dissipation of energy that typically would occur from a deformation that would otherwise happen if, during the throwing of the pet toy 2, the pet toy 2 bounces or falls on the surface 4. That is, the stiffening provided by the rib 32 promotes the continued rolling of the pet toy 2 by resisting certain avenues of energy dissipation that would otherwise naturally occur during use of the pet toy 2.

It is also noted that the rubbery texture of the lateral surfaces 92A and 92B likewise has the effect of maintaining the pet toy 2 in a condition rolling along the surface 4. For instance, if the pet toy 2 might have a tendency to fall to its side at some point during rolling, the rubbery and thus high friction lateral surfaces 92A and 92B will grip the surface 4 and will redirect the rolling motion of the pet toy 2 rather than permitting the pet toy 2 to slide along or fall onto the surface 4 on its side, which promotes rolling of the pet toy 2. The frictional lateral surfaces 92A and 92B will also promote rolling of the pet toy 2 when the pet toy 2 is rolled along uneven surfaces or irregular surfaces, whereby an irregularity that might otherwise cause the pet toy 2 to fall to its side might be resisted from tipping the pet toy 2 to its side since, during rolling motion of the pet toy 2, the grip of the lateral surfaces 92A and 92B on the surface 4 will cause the pet toy 2 to continue rolling in any of a wide variety of directions rather than merely falling to its side and sliding on the surface 4. The enhanced rolling provided by the pet toy 2 increases the interest of an animal in the pet toy 2 since such continued rolling is interesting to an animal, as is the tendency of the pet toy 2 to change directions while rolling due to frictional contact between the lateral surfaces 92A and 92B with the surface 4.

As mentioned above, the core 28 may be formed of a buoyant material which gives the pet toy 2 an overall buoyant quality whereby the pet toy 2 will float when thrown into a body of water. The pet toy 2 can therefore be used in a water retrieval play mode, which further enhances the interest of the animal in the pet toy 2. Furthermore, the resistance of the outboard portion 20, the inboard portion 24, and the core 28 to puncture damage due to biting enables the pet toy 2 to satisfy an animal's natural urge to chew without destroying the pet toy 2, thereby likewise increasing the interest of the animal in the pet toy 2.

During use, the user can grip the rubbery peripheral surface 88 and/or the rubbery lateral surfaces 92A and 92B and/or the fabric inboard surface 96 which itself is generally roughened due to the texture of the fabric from which the inboard portion 24 is formed. By holding the pet toy 2 in a wide variety of fashions when throwing the pet toy 2, the pet toy 2 can be caused to fly, bounce, and roll in any of a wide variety of fashions that are intended to maintain the interest of the animal in the pet toy 2.

While the exemplary pet toy 2 is depicted in FIG. 2 as being of a ring-like shape which, in the exemplary depicted embodiment of FIGS. 1-3 is generally circular, it is noted that FIGS. 4A, 4B, 4C, and 4D depict other ring-like variations of the pet toy 2 that are of non-circular shapes and that thus have bodies that are a varying radius from a center of the opening thereof. It is noted that the variations in radius are depicted in an exaggerated fashion in FIGS. 4A-4D in order to more clearly illustrate the potential for departing from a purely circular shape while still enabling the resultant pet toy to roll and wobble and bounce, which can provide further interest in the toy by the animal. The alternative pet toys depicted generally in FIGS. 4A-4D are understood to include all of the features of the pet toy 2 without such features necessarily being depicted explicitly in FIGS. 4A-4D.

Figure 4A:
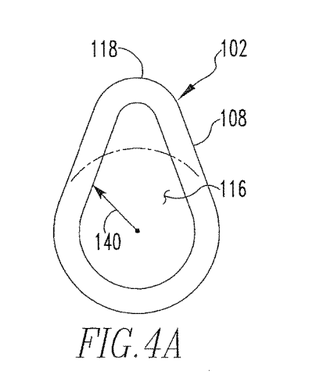
FIGS. 4A, 4B, 4C, and 4D schematically depict in an exaggerated fashion four different alternative ring-like shapes of a second embodiment, a third embodiment, a fourth embodiment, and a fifth embodiment of a pet toy in accordance with the disclosed and claimed concept.

FIG. 4A depicts an improved pet toy in accordance with a second embodiment of the disclosed and claimed concept that includes a ring-like body 108 that extends circumferentially about an opening 116 and that has a lobe 118 which causes its body 108 to depart from a strictly circular shape. The rolling of the pet toy 102 on the surface 4, by way of example, will cause the pet toy 102 to wobble while rolling, which increases the interest of the animal in the pet toy 102.

Figure 4B:
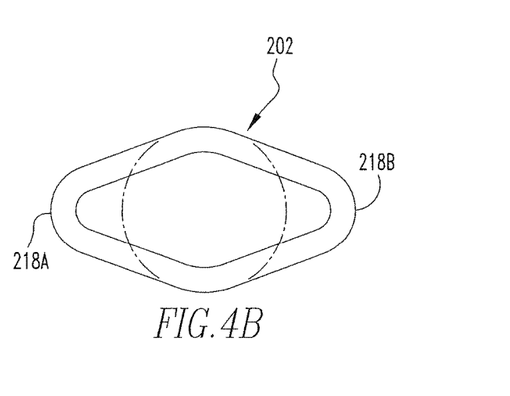
Figure 4C:
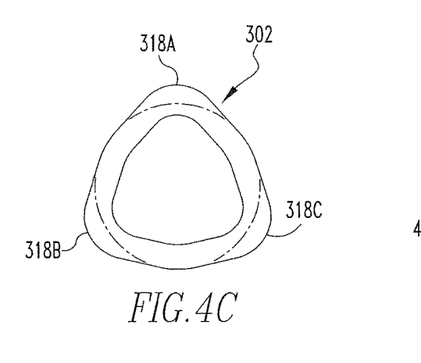
Figure 4D:
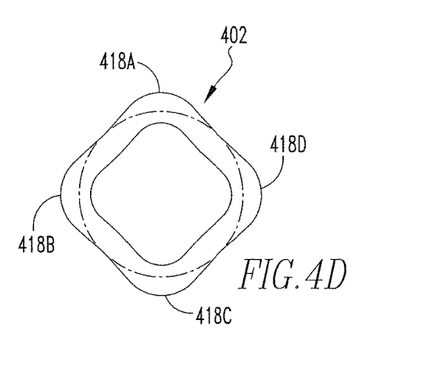

FIG. 4B depicts an improved pet toy 202 in accordance with a third embodiment of the disclosed and claimed concept that includes a pair of lobes 218A and 218B. FIG. 4C depicts an improved pet toy 302 in accordance with a fourth embodiment of the disclosed and claimed concept that includes three lobes 318A, 318B, and 318C. Furthermore, FIG. 4D depicts an improved pet toy 402 in accordance with a fifth embodiment of the disclosed and claimed concept that includes four lobes 418A, 418B, 418C, and 418D. Other variations will be apparent. The pet toys depicted generally in FIGS. 4A-4D thus wobble and bounce while rolling due to the non-circular shape of its ring-like or hoop-like body.

Figure 5A:
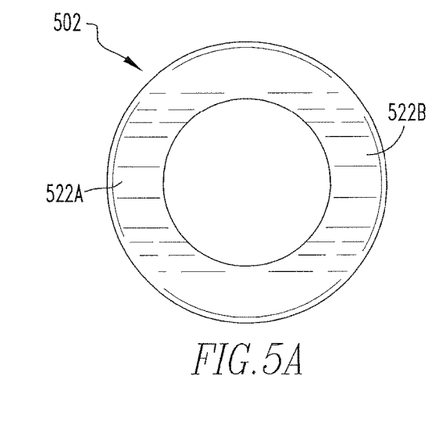
FIGS. 5A and 5B depict side and rear views, respectively, of an improved pet toy in accordance with a sixth embodiment of the disclosed and claimed concept.
Figure 5B:
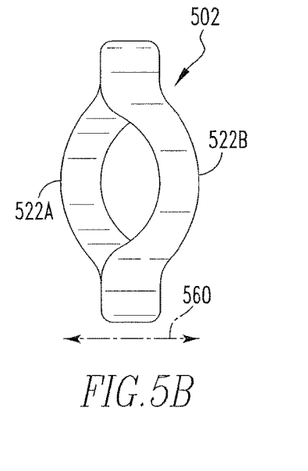

An improved pet toy 502 in accordance with a sixth embodiment of the disclosed and claimed concept is depicted generally in FIGS. 5A and 5B. The improved pet toy 502 has a ring-like shape that is generally circular but additionally includes a pair of undulations 522A and 522B that extend along a widthwise direction 560 from other portions of the pet 502. The undulations 522A and 522B give the pet toy 502 a further complex shape which provides further variation in movement when rolling. The undulations 522A and 522B can tend to cause the pet toy 502 to bounce when rolling or can cause the pet toy 502 to move in other fashions, which enhances the interest of the animal in the pet toy 502. While the cross-sectional shape of the body of the pet toy 502 is generally unvarying along its circumference, the rib of the pet toy 502 will not lie in a plane.

Figure 6A:
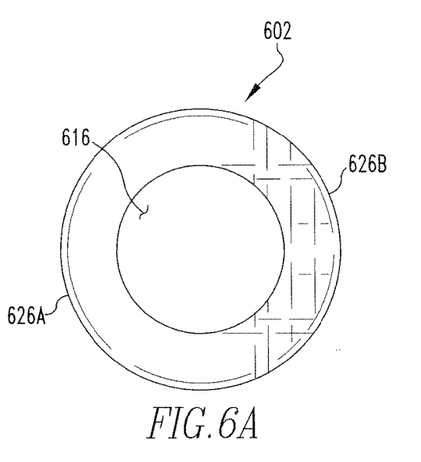
FIGS. 6A, 6B, and 6C depict side, rear, and top views of an improved pet toy in accordance with a seventh embodiment of the disclosed and claimed concept.
Figure 6B:
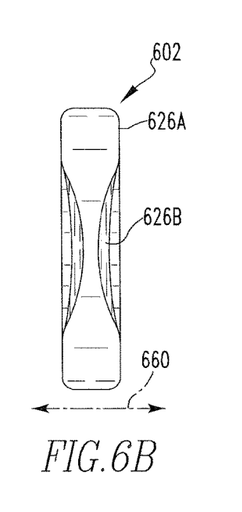
Figure 6C:
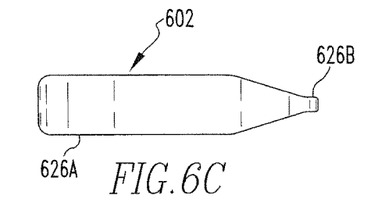

An improved pet toy 602 in accordance with a seventh embodiment of the disclosed and claimed concept is depicted generally in FIGS. 6A, 6B, and 6C. The pet toy 602 is of a ring-like shape that is generally circular, as can be seen in FIG. 6A. However the pet toy 602 includes a region of a standard or nominal width 626A, and additionally includes a region of an altered width 626B. The regions of standard and altered width 626A and 626B together extend substantially continuous about the circumference of an opening 616 in the pet toy 602. That is, the region of standard width 626A is of a given, nominal, fixed width in the widthwise direction 660 along its circumferential extent, and the region of altered width 626B is of a different width in the widthwise direction 660 along its circumferential extent. In the depicted exemplary embodiment, the region of altered width 626B is of a smaller dimension than the region of standard width 626A, but it is understood that any of a wide variety of changes in width and/or thickness can be employed without departing from the present concept. The region of altered width 626B can be employed to provide a designated bite zone if the animal should desire to pick up the pet toy 602 in its mouth at a region of relatively smaller physical dimension. Moreover, the region of altered width 626B has a different mass per length of circumference than the region of standard width 626A, whereby such imbalance would tend to cause the pet toy 602 to wobble during rolling, which increases the interest of the animal in the pet toy 602.

Figure 7:
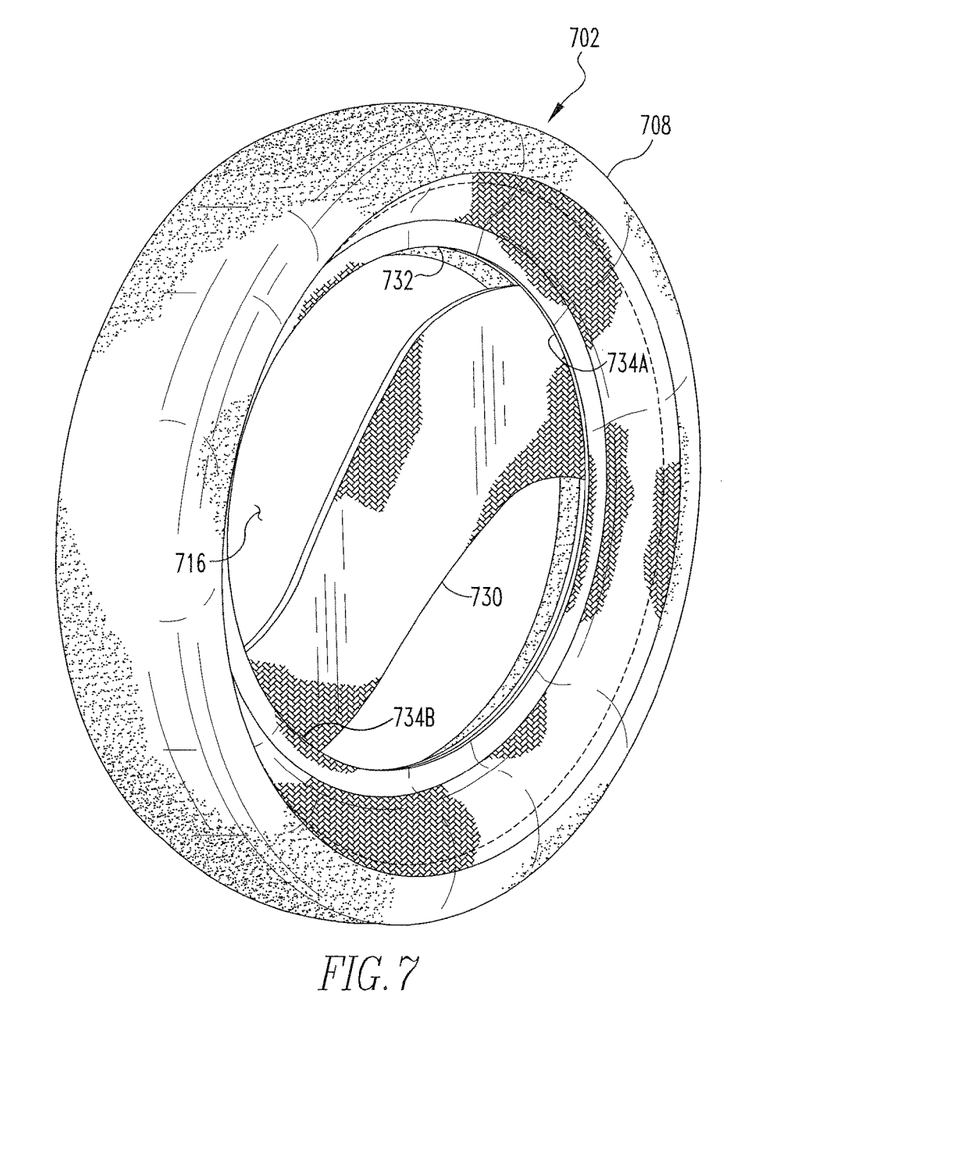
FIG. 7 is a perspective view of an improved pet toy in accordance with an eighth embodiment of the disclosed and claimed concept.

An improved pet toy 702 in accordance with an eighth embodiment of the disclosed and claimed concept is depicted generally in FIG. 7. The pet toy 702 includes a body 708 that is substantially the same as the body 8 of the pet toy 2. However, the pet toy 702 additionally includes a bridging element 730 that extends across an opening 716 thereof between two portions 734A and 734B of the rib 732 that are diametrically opposed. The bridging element 730 can increase the stiffness of the pet toy 702, meaning that it can further resist deformation of the pet toy 702 in a radial direction. The bridging element 730 can also add an interesting visual element that increases the interest of the animal in the pet toy 702. Moreover, and depending upon the particular configuration of the bridging element 730, the bridging element 730 can impart a dynamic imbalance to the pet toy 702 which can the pet toy 702 to wobble and/or bounce when rolling, which increases the visual interest of the animal in the pet toy 702.

It is reiterated that all of the pet toys 2, 102, 202, 302, 402, 502, 602, and 702 are each constructed in substantially the same fashion, i.e., such as by having the cross sectional properties depicted generally in FIG. 3. Each such pet toy thus includes inboard and outboard portions that surround a core and that include a protuberant rib that resists deformation of the pet toy. It is also understood that other variations will be apparent based upon the foregoing.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A pet toy structured to be rollable along a surface and comprising:
    a ring-like body extending in a circumferential direction about a central opening, the ring-like body comprising,
        an exterior part defining an exterior surface having an inboard portion and an outboard portion, the inboard portion being situated adjacent the central opening to define an inner circumferential surface of the exterior surface and formed at least in part of a plurality of interconnected fibers, the inboard portion having a protuberant rib extending in a circumferential direction about the opening and protruding toward a center of the opening, the rib being structured to resist deformation of the body in a radial direction from the center,
        the outboard portion being disposed opposite the inboard portion to define an outer circumferential surface of the exterior surface that is in part arcuate, the outboard portion having a pair of oppositely facing axial surfaces that are separated by a distance that is a maximum width of the ring-like body, the outboard portion being substantially entirely formed of an elastomeric material such that the maximum width of the ring-like body is defined by the elastomeric material; and
    an interior part having a resilient core disposed inside of the outboard portion and the inboard portion, the outboard portion having a higher density than a density of the resilient core so that a mass of the ring-like body is greater at the outboard portion.

2. The pet toy of claim 1, wherein
the inboard portion and the outboard portion are directly connected together.

3. The pet toy of claim 1, wherein
the inboard portion and the outboard portion are directly affixed to one another and are each directly affixed to the core.

4. The pet toy of claim 1, wherein
the body further comprises a bridging element extending across the opening between a first portion of the rib and a second portion of the rib, the first and second portions being diametrically opposed.

5. The pet toy of claim 1, wherein
the body extends in the circumferential direction at a fixed radius from the center of the opening and includes at least a first undulation, at least a portion of the body extending at the fixed radius in a direction transverse to the circumferential direction.

6. The pet toy of claim 1, wherein
the body has a substantially unvarying thickness throughout the circumferential extent of the body.

7. The pet toy of claim 6, wherein
the body has a substantially unvarying width throughout the circumferential extent of the body.

8. The pet toy of claim 6, wherein
the body has a first width and a second width, the first width being unvarying, the second width being different from the first width, the first and second widths extending in a direction orthogonal to the radial and circumferential directions.

9. The pet toy of claim 1, wherein
the core is formed at least in part of a resilient foam.

10. The pet toy of claim 1, wherein
the body includes an outer wall, an inner wall, a first sidewall, and a second sidewall that are layers of the body that enclose the core.

11. The pet toy of claim 10, wherein
the outboard portion forms at least a portion of each of the first and second sidewalls.

12. The pet toy of claim 10, wherein
the rib defines the inner circumferential surface of the body.

13. The pet toy of claim 1, wherein
the maximum thickness of the outboard portion being greater than a maximum thickness of the inboard portion.

14. The pet toy of claim 1, wherein
the outboard portion further includes a pair of ledges, each of the ledges being affixed to an end of the inboard portion at an overlapping area of the inboard and outboard portions.

15. The pet toy of claim 1, wherein
the protuberant rib defines the inner circumferential surface and has an overlapping area of the first and second.

16. The pet toy of claim 15, wherein
a thickness of the protuberant rib is greater than a combined thickness of the first and second segments of the inboard portion.

17. The pet toy of claim 15, wherein
the overlapping area of the first and second segments includes a seam affixing the first and second segments together such that the protuberant rib is a stiffened portion of the ring-like body.

* * * * *